United States Patent [19]

Shibata

[11] Patent Number: 4,986,837
[45] Date of Patent: Jan. 22, 1991

[54] APPARATUS FOR DEGASSING A LIQUID

[76] Inventor: Yoshihiko Shibata, 83-11 Matsushin-cho, Okayama-shi 704, Japan

[21] Appl. No.: 130,634

[22] Filed: Dec. 9, 1987

[30] Foreign Application Priority Data

Dec. 12, 1986 [JP] Japan .......................... 61-190485[U]

[51] Int. Cl.$^5$ ............................................ B01D 19/00
[52] U.S. Cl. ....................................... 55/190; 55/158; 55/159; 55/189
[58] Field of Search .................. 55/16, 55, 158, 159, 55/189, 190

[56] References Cited

U.S. PATENT DOCUMENTS

| | | | |
|---|---|---|---|
| 3,651,518 | 3/1972 | Klein et al. | 55/158 X |
| 3,668,837 | 6/1972 | Gross | 55/158 |
| 3,735,562 | 5/1973 | Mousseau, Jr. et al. | 55/158 |
| 3,751,879 | 8/1973 | Allington | 55/189 X |
| 3,778,971 | 12/1973 | Granger et al. | 55/159 |
| 4,268,279 | 5/1981 | Shindo et al. | 55/158 X |
| 4,325,715 | 4/1982 | Bowman et al. | 55/159 X |
| 4,432,775 | 2/1984 | Won | 55/190 X |
| 4,469,495 | 9/1984 | Hiraizumi et al. | 55/189 |
| 4,523,937 | 6/1985 | Joshua | 55/189 |

FOREIGN PATENT DOCUMENTS

| | | | |
|---|---|---|---|
| 2419676 | 10/1974 | Fed. Rep. of Germany | 55/159 |
| 2658285 | 10/1977 | Fed. Rep. of Germany | 55/158 |
| 2907188 | 8/1979 | Fed. Rep. of Germany | 55/159 |
| 216606 | 12/1984 | Japan | 55/189 |
| 48104 | 3/1985 | Japan | 55/159 |
| 147201 | 8/1985 | Japan | 55/158 |
| 101226 | 2/1986 | Japan | 55/158 |
| 132509 | 6/1987 | Japan | 55/189 |
| 1011540 | 4/1983 | U.S.S.R. | 55/189 |
| 960712 | 6/1964 | United Kingdom | 55/158 |
| 2099718 | 12/1982 | United Kingdom | 55/159 |

Primary Examiner—Robert Spitzer
Attorney, Agent, or Firm—Mortenson & Uebler

[57] ABSTRACT

Liquid degassing apparatus is provided wherein one or more porous, hydrophobic tubes are installed inside a vacuum chamber, each such tube having an atomizer located near its inlet end. As liquid to be degassed enters the tube, it is atomized and gas in the liquid passes out of the atomized liquid, through the porous tube and exits the vacuum chamber. The remaining degassed liquid exits the porous, hydrophobic tube through the downstream end of the porous tube and exits the chamber.

4 Claims, 1 Drawing Sheet

U.S. Patent  Jan. 22, 1991  4,986,837
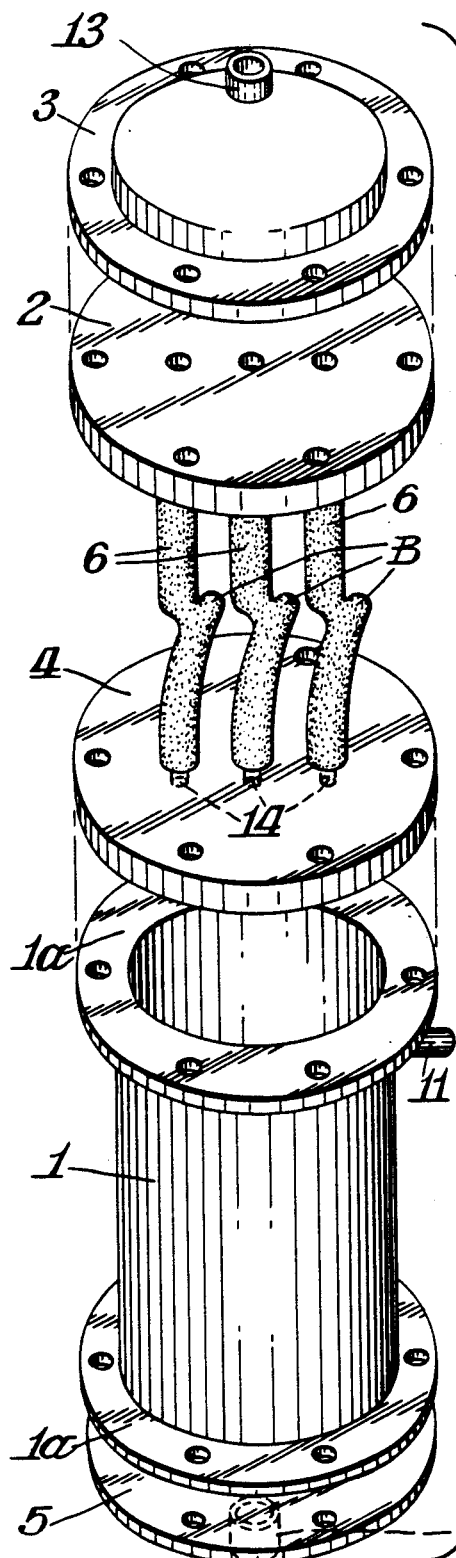
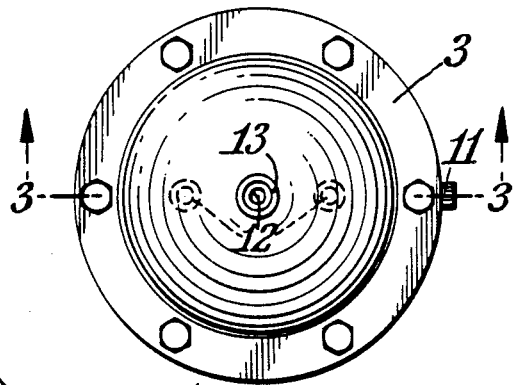
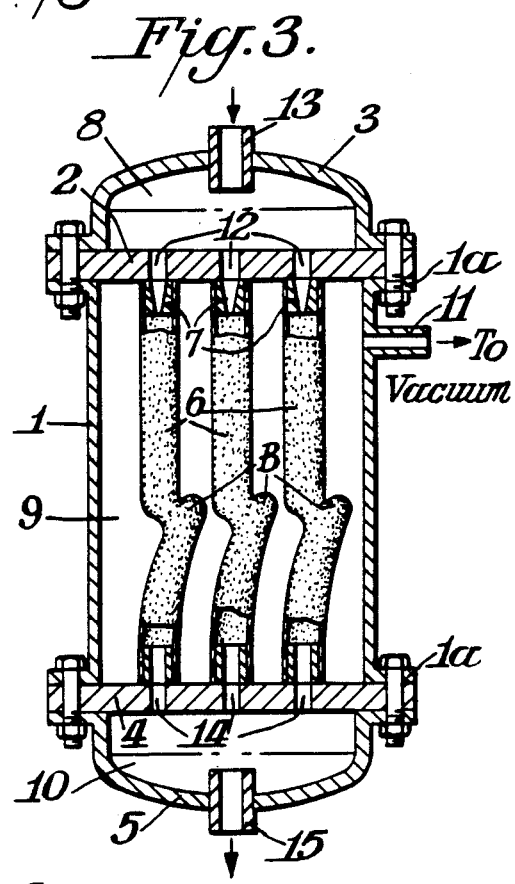

APPARATUS FOR DEGASSING A LIQUID

BACKGROUND OF THE INVENTION

The present invention relates to liquid degassing apparatus. The object of the present invention is to provide a mechanism which makes it possible to efficiently remove gaseous components contained in various types of liquids.

The present invention provides a degassing technique for producing ultra-pure water and various types of chemical solutions and test solutions, etc., used in the electronics industry and elsewhere.

In cases where the admixture of air and other gases with ultra-pure water and various other types of liquids is undesirable, degassing is necessary. Various degassing mechanisms have been devised for this purpose. For example, (A) mechanisms in which the liquid that is to be treated is introduced to one side of a porous tube or porous film, and degassing is accomplished from the other side of the porous tube or porous film, and (B) mechanisms in which degassing is accomplished by causing ultrasonic waves to act on the liquid that is to be treated, are known.

In mechanisms of the above-mentioned type (A), the area of contact between the liquid and the porous body must be increased in order to increase the degassing efficiency. For this purpose, means such as reduction of tube diameter or lengthening of tubes, or folding of films into pleats, have been adopted. In all of these cases, however, the amount of gas permeation through the porous body itself is much greater than the amount of gas permeation required for degassing, so that the efficiency is greatly influenced by the velocity at which the gas travels (diffuses) from the interior of the liquid to the point of contact with the porous body. In other words, the large amount of air permeation through the porous body itself is not utilized to full advantage.

Furthermore, in mechanisms which accelerate the movement of gases by causing ultrasonic waves to act on the liquid, it is necessary to introduce a substitute gas after degassing in order to prevent reinvasion by gases in the air. Depending on the intended use, this exchange of gases may be effective in the removal of undesirable gases. However, such an exchange of gases is insufficient in almost all cases.

Furthermore, it is also possible to degas a sprayed liquid directly without using porous tubes. In such a case, however, only a water-sealed pump can be used, since the water droplets penetrate into the vacuum pump. The maximum vacuum pressure of such a pump is approximately 200 Torr, which is extremely low compared to the vacuum pressure of an oil-sealed pump. As a result, the degassing efficiency of such a mechanism is unavoidably poor.

SUMMARY OF THE INVENTION

Apparatus for degassing a liquid containing a gas is provided comprising a vacuum chamber, inlet supply means to the vacuum chamber for feeding liquid to be degassed into the vacuum chamber, outlet discharge means from the vacuum chamber through which degassed liquid is discharged, and at least one porous, hydrophobic tube extending from the inlet supply means, through the vacuum chamber and to the outlet discharge means, each porous, hydrophobic tube having, near its inlet end, means for atomizing the liquid to be degassed as it enters the tube. As liquid containing gas enters the porous, hydrophobic tube(s) and is atomized by the means for atomizing the liquid, the gas passes through the porous tube into and out of the vacuum chamber and the remaining degassed liquid exits the porous tube through the outlet discharge means. The hydrophobic tube is preferably a tube of porous, expanded polytetrafluoroethylene (PTFE). The apparatus preferably has a plurality of porous, hydrophobic tubes. The porous, hydrophobic tube preferably has a bend located near the discharge end of the tube.

BRIEF DESCRIPTION OF THE DRAWINGS

FIG. 1 is an exploded pictorial view of the degassing apparatus according to the invention.

FIG. 2 is a top plan view of the apparatus.

FIG. 3 is a cross-sectional view of the apparatus taken along line 3—3 of FIG. 2.

DETAILED DESCRIPTION OF THE INVENTION AND PREFERRED EMBODIMENTS WITH REFERENCE TO THE DRAWINGS

Liquid degassing apparatus is provided wherein one or more porous, hydrophobic tubes are installed inside a vacuum chamber, each such tube having atomizing means located near its inlet end. As liquid to be degassed enters the tube, it is atomized and gas in the liquid passes out of the atomized liquid, through the porous tube and exits the vacuum chamber. The remaining degassed liquid exits the porous, hydrophobic tube through discharge means located at the downstream end of the porous tube and exits the chamber.

Specifically, the present invention consists of degassing apparatus which is characterized by (a) at least one porous tube installed inside a degassing chamber which is designed so that the pressure in the chamber can be reduced, and (b) a spray nozzle which sprays the liquid that is to be treated being installed inside the porous tube.

The liquid that is to be treated, which has been atomized by the aforesaid spray nozzle, is fed into the interior of the porous tube installed in the degassing chamber.

The surface area of a liquid which has been atomized as described above is at least several hundred times greater than that of a liquid which simply flows downwardly. Accordingly, the high gas permeability of the porous tube is advantageously utilized, and the removal of gases from the sprayed and atomized liquid is effectively achieved. The gases removed from the sprayed liquid are discharged into the degassing chamber, which is at a reduced pressure. Meanwhile, the liquid droplets move downward through the interior of the porous tube, and are conducted into a liquid reservoir, from which they are discharged in liquid form once again.

The lower portion of the aforementioned tube is preferably bent before it again connects with the liquid reservoir chamber. As a result, the atomized liquid is returned to a coalesced liquid state. Even in the case of a short thick tube, the liquid enters the liquid reservoir chamber in a liquid state without any substantial incorporation of gases from the air.

The following is a description of an example of the application of the present invention with reference to the accompanying drawings.

As shown in FIGS. 1 and 3, an upper cap 3 is attached (via a nozzle attachment header 2) to a cylindrical chamber 1 by flange 1*a*. Chamber 1 has a degassing port 11 formed on one side near the top of the chamber. Furthermore, a lower cap 5 is attached to the bottom of the aforementioned cylindrical chamber 1 via a lower header 4 by flange 1*a*. A liquid inlet port 13 is formed in the aforementioned upper cap 3, and a liquid discharge port 15 is formed in the aforementioned lower cap 5. At least one porous tube 6 formed from a porous material such as porous polytetrafluoroethylene is connected between a liquid inlet port 12 formed in the central portion of the aforementioned nozzle attachment header 2 and a discharge port 14 formed in the central portion of the aforementioned lower header 4. A spray nozzle 7 is attached to the aforementioned liquid inlet port 12, and a vacuum pump (not shown) is connected to the aforementioned degassing port 11 so that the pressure inside the cylindrical chamber 1 can be reduced. Sealing parts such as O-rings are appropriately interposed between the flange portions 1*a*of the cylindrical chamber 1 and the respective headers 2 and 4, and between these headers 2 and 4 and the respective caps 3 and 5, so that airtightness is maintained between the respective parts. Thus, a degassing region 9 whose pressure can be effectively reduced is formed inside the cylindrical chamber 1. Stable and secure connections can be obtained by using heat-shrink tubing in the areas of connection of the tube 6 to the liquid supply chamber 8 and liquid reservoir chamber 10.

The liquid supply chamber 8, into which the liquid to be treated is supplied from the aforementioned liquid inlet port 13, is formed between the aforementioned upper cap 3 and the nozzle attachment header 2. The liquid reservoir chamber 10 is formed between the aforementioned lower cap 5 and lower header 4. As is shown in the figures, the aforementioned porous tube 6 is installed so that it is appropriately bent, indicated at B in FIG. 3, inside the degassing region 9 in the cylindrical chamber 1.

The surface area of the liquid to be treated, which is atomized by the spray nozzle 7, is increased by at least several hundred times compared to a case in which the liquid simply flows downward through the aforementioned tube 6. Generally, this increase is a thousand-fold or greater. Furthermore, the liquid, whose surface area has thus been increased by atomization, does not fill or block the interior surface of the porous tube 6. Accordingly, the removal of contained gases from the atomized droplets is effectively achieved by diffusion outwardly therefrom, and the gas components thus removed are securely discharged into the degassing chamber 9 outside the porous tube 6 through the pores of the porous tube 6.

If necessary, two or more porous tubes 6 of the type described above may be installed between the respective caps 3 and 5. Three are shown in the drawings. In such a case, a spray nozzle 7 such as that described above is installed in each of these porous tubes 6.

For completeness, FIG. 3 is a top plan view of the apparatus showing cap 3, inlet port 13, gas discharge port 11 and liquid inlet ports 12.

The following is a description of an example of utilization of the present invention, wherein four tubes were employed.

The following type of tube was used for the abovementioned porous tubes 6: internal diameter, 12.5 mm; external diameter, 14.0 mm; porosity, 50%; maximum pore diameter, 0.7 mm; gas permeation rate, 300 $cc/cm^2.min.$ (at 1 $kg/cm^2$); length, 200 mm. A substantially conical nozzle was used as the spray nozzle 7 inside each porous tube 6, and tap water was sprayed into the chamber at a rate of 20 cc/min. Treatment was performed with the pressure outside the tubes 6 reduced to 20 Torr by means of a vacuum pump. The amount of solute oxygen in the water obtained from the liquid discharge port 15 was 0.1 ppm.

Such a result represents the same amount of treatment as that obtained using a conventional, commercially marketed tube-type degassing apparatus employing a tube with an internal diameter of 15 mm and a length of 11.0 mm, and thus represents an increase of 730% in the efficiency per unit area of the tube. It is thus seen that a substantial increase in efficiency is achieved.

In the present invention, constructed as described above, degassing is performed by spraying the liquid that is to be degassed into at least one porous tube, and reducing the pressure outside the porous tube. As a result, extremely high-efficiency degassing can be achieved. Accordingly, degassing treatments required for high precision in various industries can be performed inexpensively and by means of a compact device. Thus, the present invention has great industrial merit.

While the invention has been disclosed herein in connection with certain embodiments and detailed descriptions, it will be clear to one skilled in the art that modifications or variations of such details can be made without deviating from the gist of this invention, and such modifications or variations are considered to be within the scope of the claims hereinbelow.

What is claimed is:

1. Apparatus for degassing a liquid containing a gas comprising:
   - a vacuum chamber,
   - inlet supply means to said vacuum chamber for feeding liquid to be degassed into said vacuum chamber,
   - outlet discharge means from said vacuum chamber through which degassed liquid is discharged, and
   - at least one porous, hydrophobic tube of porous, expanded polytetrafluoroethylene (PTFE) extending from said inlet supply means, through said vacuum chamber and to said outlet discharge means,
   - each said porous, hydrophobic tube having, near its inlet end, means for atomizing said liquid to be degassed as it enters said tube,
   - whereby, as liquid containing gas enters said porous, hydrophobic tube and is atomized by said means for atomizing said liquid, said gas passes through said porous tube and out of said vacuum chamber and the remaining degassed liquid exits said porous tube through said outlet discharge means.

2. The apparatus of claim 1 having a plurality of said porous, hydrophobic tubes.

3. The apparatus of claim 2 wherein each said porous, hydrophobic tube has a bend located near the discharge end of said tube.

4. The apparatus of claim 1 wherein said porous, hydrophobic tube has a bend located near the discharge end of said tube.

* * * * *